US012639951B2

(12) United States Patent
Yamamoto

(10) Patent No.: US 12,639,951 B2
(45) Date of Patent: May 26, 2026

(54) COMPUTER-READABLE RECORDING MEDIUM STORING VIDEO ANALYZING PROGRAM, VIDEO ANALYZING METHOD, AND VIDEO ANALYZING DEVICE

(71) Applicant: Fujitsu Limited, Kawasaki (JP)

(72) Inventor: Takuma Yamamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 18/472,098

(22) Filed: Sep. 21, 2023

(65) Prior Publication Data

US 2024/0203164 A1     Jun. 20, 2024

(30) Foreign Application Priority Data

Dec. 19, 2022    (JP) ................................. 2022-202661

(51) Int. Cl.
*G06V 20/52*     (2022.01)
*G06V 10/22*     (2022.01)
*G06V 10/25*     (2022.01)
*G06V 10/77*     (2022.01)
*G06V 20/40*     (2022.01)
*G06V 40/20*     (2022.01)

(52) U.S. Cl.
CPC .............. *G06V 20/52* (2022.01); *G06V 10/22* (2022.01); *G06V 10/25* (2022.01); *G06V 10/7715* (2022.01); *G06V 20/46* (2022.01); *G06V 40/20* (2022.01)

(58) Field of Classification Search
CPC ........ G06V 20/52; G06V 20/46; G06V 20/20; G06V 10/22; G06V 10/25; G06V 10/7715
See application file for complete search history.

(56) References Cited

U.S. PATENT DOCUMENTS

2019/0163982 A1*  5/2019  Block .................... G06N 5/022
2023/0051232 A1*  2/2023  Zhou ...................... G06V 40/20

FOREIGN PATENT DOCUMENTS

CN        115346157      11/2022
EP        4053812 A1     9/2022
(Continued)

OTHER PUBLICATIONS

EESR—Extended European Search Report dated Feb. 26, 2024 for corresponding European Patent Application No. 23199379.1 [9 pages].

(Continued)

*Primary Examiner* — Casey L Kretzer
(74) *Attorney, Agent, or Firm* — Fujitsu Intellectual Property Center

(57) ABSTRACT

A non-transitory computer-readable recording medium stores an information processing program for causing a computer to execute processing including: acquiring a video; specifying a first region that includes an object included in the video, a second region that includes a person included in the video, and a relation that identifies an interaction between the object and the person, by analyzing the acquired video; determining whether or not the person included in the second region performs abnormal behavior, based on the specified first region and the specified relation; and notifying an alert related to appearance of the person who performs the abnormal behavior in a case of determining that the person performs the abnormal behavior.

12 Claims, 19 Drawing Sheets

(56)            References Cited

FOREIGN PATENT DOCUMENTS

| JP | 2022-86742 | 6/2022 | |
| JP | 2022-113042 | 8/2022 | |
| JP | 2022-165483 | 11/2022 | |
| JP | 2022-170790 | 11/2022 | |
| WO | WO-2022184872 A1 * | 9/2022 | ............. G06V 20/52 |

OTHER PUBLICATIONS

EPOA—European Office Action dated Mar. 24, 2026 for corresponding European Patent Application No. 23199379.1 (5 pages).
JPOA—Japanese Office Action mailed Apr. 21, 2026 for corresponding Japanese Patent Application No. 2022-202661 with Machine Translation (8 pages).

* cited by examiner

FIG. 5

| CAMERA ID | INSTALLATION LOCATION |
|-----------|----------------------|
| 1 | FLOOR 1 AREA A |
| 2 | FLOOR 1 AREA B |
| 3 | FLOOR 1 AREA C |
| ... | ... |

FIG. 6

| RULE ID | OBJECT | RELATION | ... |
|---------|--------|----------|-----|
| 1 | SHELF | STEP ON | ... |
| 2 | ROTATING CUTTER | APPROACH | ... |
| 3 | OPENING | APPROACH | ... |
| ... | ... | ... | ... |

Subject

Object

Attention MAP

FIG. 16

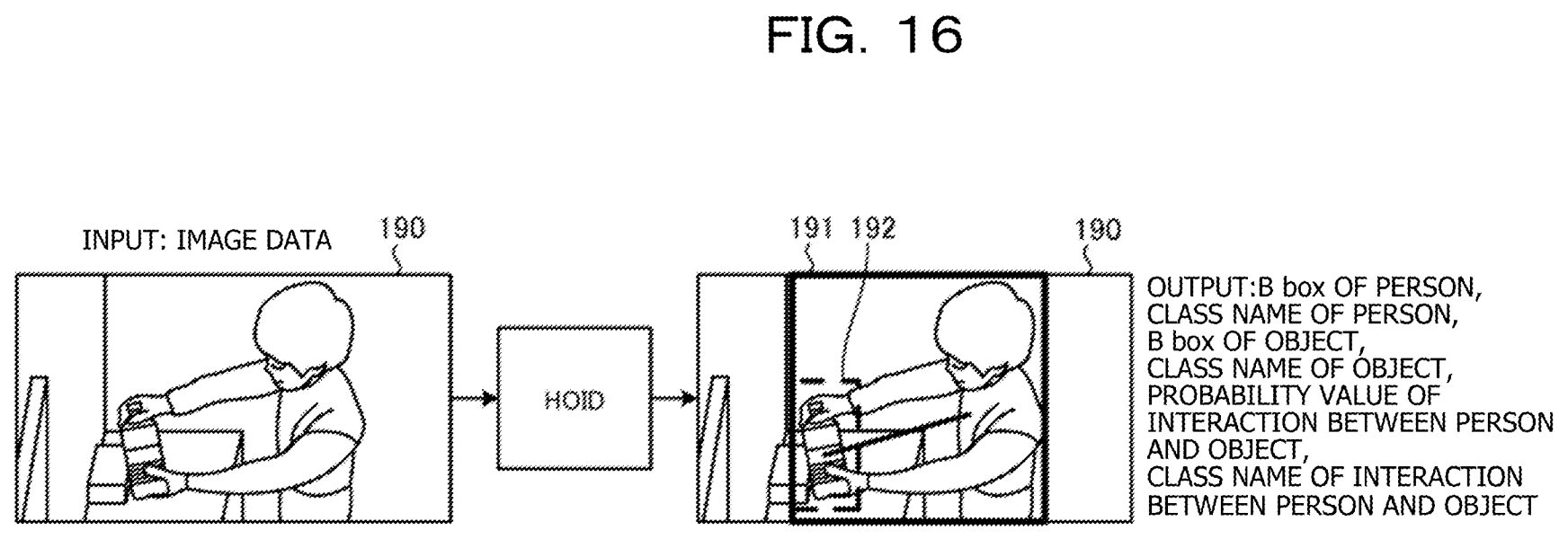

INPUT: IMAGE DATA

190

HOID

190

191 192

OUTPUT:B box OF PERSON,
CLASS NAME OF PERSON,
B box OF OBJECT,
CLASS NAME OF OBJECT,
PROBABILITY VALUE OF
INTERACTION BETWEEN PERSON
AND OBJECT,
CLASS NAME OF INTERACTION
BETWEEN PERSON AND OBJECT

COMPUTER-READABLE RECORDING MEDIUM STORING VIDEO ANALYZING PROGRAM, VIDEO ANALYZING METHOD, AND VIDEO ANALYZING DEVICE

CROSS-REFERENCE TO RELATED APPLICATION

This application is based upon and claims the benefit of priority of the prior Japanese Patent Application No. 2022-202661, filed on Dec. 19, 2022, the entire contents of which are incorporated herein by reference.

FIELD

The embodiment discussed herein is related to an information processing program, an information processing method, and an information processing device that identify a person who performs abnormal behavior from a video.

BACKGROUND

For example, there is a technology for identifying a person who performs abnormal behavior such as getting on an unstable scaffold or approaching a dangerous object, from a monitoring video in a factory or the like through image recognition by a computer and notifying an alert notifying an abnormality. As a result, occurrence of an accident can be prevented in advance.

Japanese Laid-open Patent Publication No. 2022-165483 is disclosed as related art.

SUMMARY

According to an aspect of the embodiments, a non-transitory computer-readable recording medium stores an information processing program for causing a computer to execute processing including: acquiring a video; specifying a first region that includes an object included in the video, a second region that includes a person included in the video, and a relation that identifies an interaction between the object and the person, by analyzing the acquired video; determining whether or not the person included in the second region performs abnormal behavior, based on the specified first region and the specified relation; and notifying an alert related to appearance of the person who performs the abnormal behavior in a case of determining that the person performs the abnormal behavior.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of information stored in a camera installation DB 14 according to the present embodiment;

FIG. 6 is a diagram illustrating an example of information stored in a rule DB 16 according to the present embodiment;

FIG. 16 is a diagram illustrating an example of relation specification based on a HOID according to the present embodiment;

DESCRIPTION OF EMBODIMENTS

For example, such a technology detects a bounding box (Bbox) that surrounds a region including an object or a person in a rectangle from the video, using a machine learning model and determines whether or not the person performs abnormal behavior based on a positional relationship between both Bboxes.

However, since a positional relationship between Bboxes detected from a video is based on a two-dimensional space, for example, it is not possible to analyze a depth between the Bboxes, and there is a case where it is not correctly determined that abnormal behavior of a person is performed. More specifically, for example, in a case where a Bbox of an unstable scaffold and a Bbox of a worker positioned on the scaffold in the video are detected from the video, even if the worker works behind the scaffold, there is a case where it is determined that the worker is on the scaffold. In this case, since the worker is on the unstable scaffold, it is determined that a person who is the worker performs abnormal behavior.

Note that, as an example of the person who performs abnormal behavior, the worker in the factory is exemplified. However, the person is not limited to this. For example, the person who performs abnormal behavior may include a children who performs dangerous behavior using playground equipment, a vehicle traveling on a traffic-free road, or the like. Note that, although the vehicle is not a person, the vehicle may be included in a target that may perform abnormal behavior, as a vehicle driven by a person. Furthermore, animals such as cats or dogs may be included in the target that may perform abnormal behavior.

In one aspect, an object is to provide an information processing program, an information processing method, and an information processing device that can accurately determine and notify that a person performs abnormal behavior from a video.

Hereinafter, examples of an information processing program, an information processing method, and an information processing device according to the present embodiment will be described in detail with reference to the drawings. Note that the present embodiment is not limited by the examples. Furthermore, the individual examples may be appropriately combined within a range without inconsistency.

Figure 1:
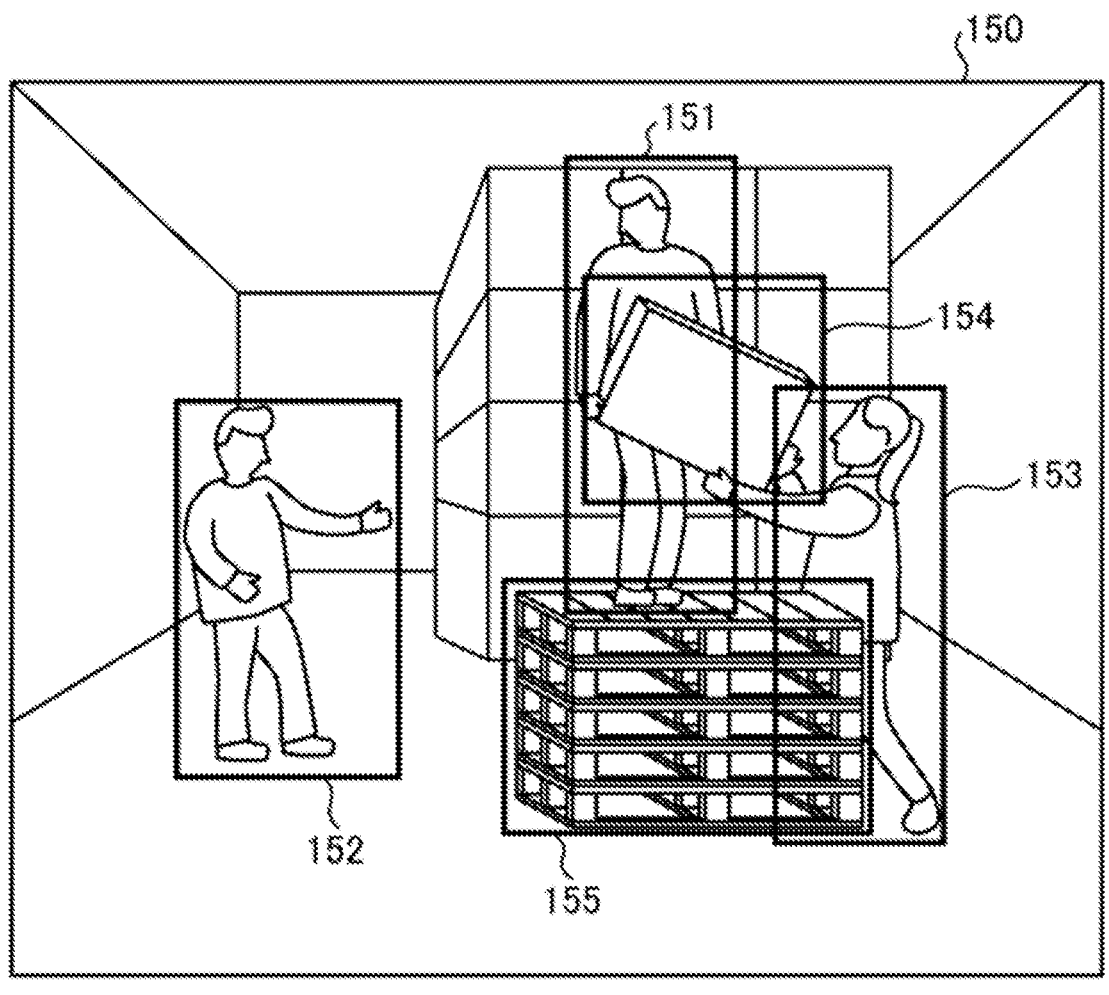
FIG. 1 is a diagram illustrating an example of object detection from a captured image.

First, general object detection from a captured image using a machine learning model will be described. FIG. 1 is a diagram illustrating an example of object detection from a captured image. In the general object detection, an object including a person is detected from a captured image, using a machine learning model that is trained and generated using the captured image as input data and an object including a person as a correct answer label. As illustrated in FIG. 1, for example, by inputting a captured image 150 into such a trained machine learning model, person Bboxes 151 to 153 and object Bboxes 154 and 155 are detected.

Then, for example, an information processing device can determine that a person indicated by the Bbox 151 is on an object indicated by the Bbox 155 and performs dangerous behavior that is an example of abnormal behavior, from a positional relationship between the Bboxes 151 and 155. However, since the positional relationship between the Bboxes is based on a two-dimensional space, more strictly, the information processing device cannot confirm that the person indicated by the Bbox 151 is on the object indicated by the Bbox 155 and only recognizes that the person is positioned above the object. Therefore, for example, even in a case where the person is behind the object, the information processing device may determine that the person is on the object.

Figure 2:
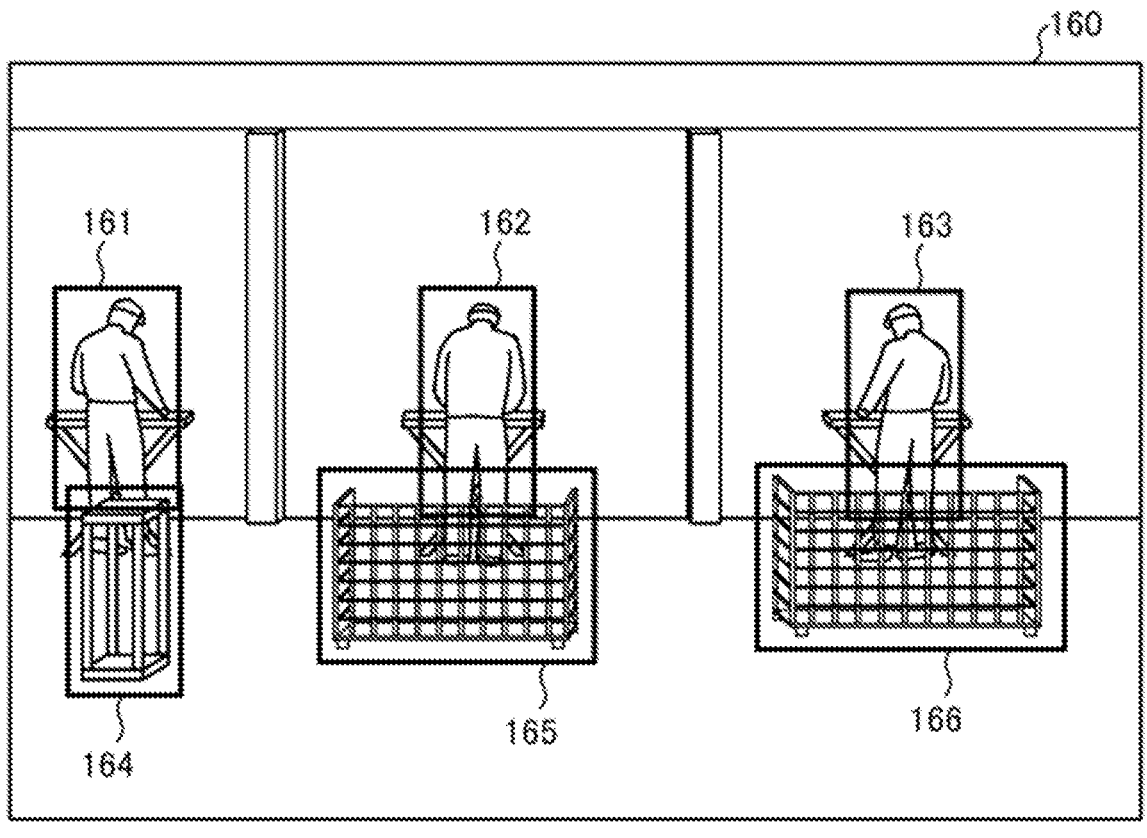
FIG. 2 is a diagram illustrating an example of a positional relationship between a person Bbox and an object Bbox.

FIG. 2 is a diagram illustrating a positional relationship between a person Bbox and an object Bbox. In the example in FIG. 2, by inputting a captured image 160 into the trained machine learning model described with reference to FIG. 1, person Bboxes 161 to 163 and object Bboxes 164 to 166 are detected. In the example in FIG. 2, each person indicated by the Bboxes 161 to 163 works behind each object indicated by the Bboxes 164 to 166. However, the information processing device may determine that each person is on each object, based on the positional relationship between the person Bbox and the object Bbox. Therefore, in the present embodiment, one of objects is to more accurately recognize a relation between a person and an object detected from a video and more accurately determine that the person performs abnormal behavior.

(Overall Configuration)

Figure 3:
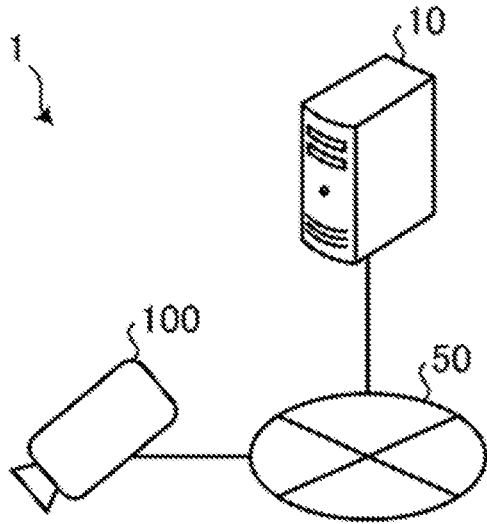
FIG. 3 is a diagram illustrating a configuration example of an information processing system 1 according to the present embodiment.

Next, an information processing system according to the present embodiment will be described. FIG. 3 is a diagram illustrating a configuration example of an information processing system 1 according to the present embodiment. As illustrated in FIG. 3, the information processing system 1 is a system in which the information processing device 10 and a camera device 100 are communicably coupled to each other via a network 50.

As the network 50, for example, various communication networks such as an internet or the Internet used in various facilities such as a factory, regardless of whether the network is wired or wireless can be adopted. Furthermore, as the network 50, for example, the intranet and the Internet may be configured via a network device such as a gateway or other devices (not illustrated), not a single network. Note that an expression "in the facility" is not limited to indoor and may include outdoor.

The information processing device 10 is, for example, an information processing device such as a desktop personal computer (PC), a notebook PC, or a server computer installed in the various facilities such as a factory and used by a worker, an administrator, or the like. Alternatively, the information processing device 10 may be a cloud computer device being managed by a service provider that provides cloud computing services.

The information processing device 10 receives, for example, a video obtained by imaging a predetermined imaging range in various facilities such as a factory by the camera device 100, from the camera device 100. Note that the video strictly includes a plurality of captured images captured by the camera device 100, that is, a series of frames of a moving image.

Furthermore, for example, the information processing device 10 extracts an object including a person in various facilities such as a factory, from the video captured by the camera device 100, using an existing object detection technology. Furthermore, for example, the information processing device 10 specifies a relation identifying an interaction between the object and the person such that the person approaches, touches, steps on the object. Furthermore, the information processing device 10 determines whether or not the person performs abnormal behavior, for example, based on the specified relation. Then, for example, in a case of determining that the person performs abnormal behavior, the information processing device 10 notifies an alert related to appearance of the person who is performing the abnormal behavior. Note that the alert may be voice output, a message notification on a screen, or the like. Furthermore, an alert notification destination may be an output device included in the information processing device 10, an external device, or an output device included in another information processing device communicably coupled to the information processing device 10 via the network 50. Furthermore, for example, the information processing device 10 may specify a place of the person who performs abnormal behavior and limits the alert notification destination to a device in a floor where the person exists, or the like. Note that, in the present embodiment, description is made as assuming that a target that may perform abnormal behavior as the person. However, a vehicle driven by a person, an animal such as a dog or a cat, or the like may be included in the target that may perform abnormal behavior. Therefore, the information processing device 10 can determine whether or not the vehicle, the animal, or the like performs the abnormal behavior, and in a case of determining that the abnormal behavior is performed, the information processing device 10 can notify an alert.

Then, a worker, an administrator, or the like in various facilities such as a factory receives the notification of the alert and stops the abnormal behavior, for example, by warning the person who is performing the abnormal behavior, so as to prevent occurrence of an accident in advance.

Note that FIG. 1 illustrates the information processing device 10 as one computer. However, the information processing device 10 may be a distributed computing system including a plurality of computers.

The camera device 100 is, for example, a surveillance camera installed in various facilities such as a factory. A video captured by the camera device 100 is transmitted to the information processing device 10. Note that, in FIG. 1, only one camera device 100 is illustrated. However, the plurality of camera devices 100 may be installed in various places in the various facilities such as a factory.

(Functional Configuration of Information Processing Device 10)

Figure 4:
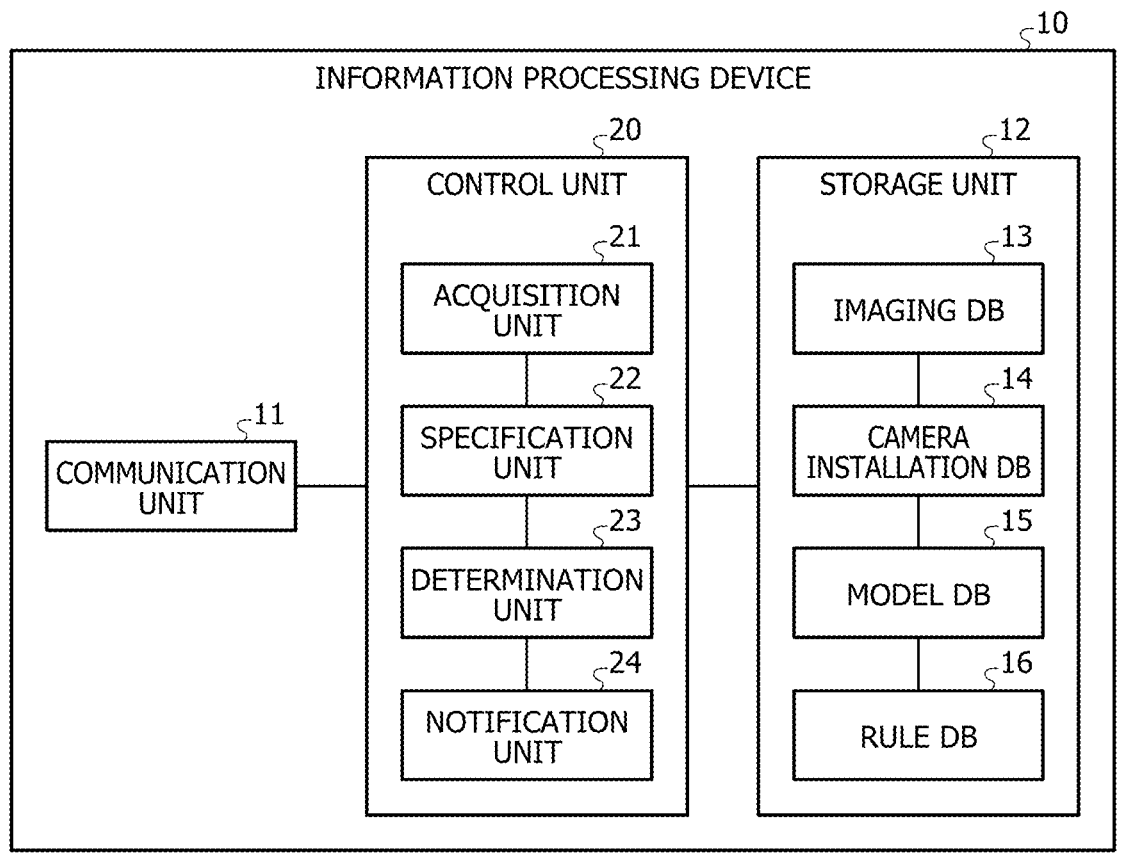
FIG. 4 is a diagram illustrating a configuration example of an information processing device 10 according to the present embodiment.

Next, a functional configuration of the information processing device 10 will be described. FIG. 4 is a diagram illustrating a configuration example of the information processing device 10 according to the present embodiment. As illustrated in FIG. 4, the information processing device 10 includes a communication unit 11, a storage unit 12, and a control unit 20.

The communication unit 11 is a processing unit that controls communication with other devices such as the camera device 100, and is, for example, a communication interface such as a network interface card.

The storage unit 12 has a function of storing various types of data and a program to be executed by the control unit 20, and is implemented by a storage device such as a memory or a hard disk, for example. The storage unit 12 stores an imaging DB 13, a camera installation DB 14, a model DB 15, a rule DB 16, or the like. Note that the DB is an abbreviation of a database (data base).

The imaging DB 13 stores a plurality of captured images that is a series of frames captured by the camera device 100. The plurality of captured images captured by the camera device 100, that is, the video is transmitted from the camera device 100 as needed, and received by the information processing device 10, and stored in the imaging DB 13.

The camera installation DB 14 stores, for example, information used to specify a place where each camera device 100 is installed. The information stored here may be preset by an administrator or the like, for example. FIG. 5 is a diagram illustrating an example of the information stored in the camera installation DB 14 according to the present embodiment. As illustrated in FIG. 5, in the camera installation DB 14, for example, each piece of information such as "camera ID, installation location" is stored in association. In the "camera ID" stored here, for example, information such as an identifier used to uniquely identify each camera device 100 is set, and in the "installation location", for example, information used to specify the place where each camera device 100 is installed is set. Note that, for example, in a case where only one camera device 100 is installed, the camera installation DB 14 does not need to be included in the storage unit 12.

The model DB 15 stores, for example, a region including an object and a person from the video captured by the camera device 100, information regarding a machine learning model that specifies a relation between the object and the person, and a model parameter used to construct the model. The machine learning model may be generated through machine learning using the video captured by the camera device 100, that is, the captured image as input data and the region including the object and the person and a type of the relation between the object and the person as correct answer labels, for example. Note that the type of the relation between the object and the person may be, for example, the person approaches, touches, or steps the object. However, the type is not limited to these. Furthermore, for example, the region including the object and the person may be a bounding box (Bbox) that surrounds these regions in a rectangle in a captured image. Note that such machine learning model that specifies the region including the object and the person and the relation between the object and the person, from the video may be a machine learning model for human object interaction detection (HOID), which is an existing technology to be described later.

Furthermore, for example, the model DB 15 stores information regarding the machine learning model used to acquire the type of the object for generating the scene graph and the relation between the objects, from the video and the model parameter used to construct the model. Note that the type of the object for generating the scene graph may be referred to as "class", and the relation between the objects may be referred to as "relation". Furthermore, the machine learning model may be generated through machine learning using the video captured by the camera device 100, that is, the captured image as input data and a place of an object (Bbox) included in the captured image, a type of the object, and a relation between the objects as correct answer labels.

Furthermore, the model DB 15 stores, for example, information regarding the machine learning model for generating an attention map to be described later and a model parameter used to construct the model. The machine learning model is trained and generated, for example, by using a feature amount of the object detected from the captured image as input data and an important region in the image as a correct answer label. Note that various machine learning models may be generated by the information processing device 10 or may be trained and generated by another information processing device.

The rule DB 16 stores, for example, information regarding a rule for determining that the person performs abnormal behavior. The information stored here may be preset by an administrator or the like, for example. FIG. 6 is a diagram illustrating an example of the information stored in the rule DB 16 according to the present embodiment. As illustrated in FIG. 6, in the rule DB 16, for example, each piece of information such as "rule ID, object, relation" is stored in association. In the "rule ID" stored here, for example, information such as an identifier used to uniquely identify a rule is set. Furthermore, in the "object", for example, a name of an object or the like is set. Furthermore, in the "relation", for example, a type of a relation between an object and a person is set. For example, in a case where the person detected from the video captured by the camera device 100 indicates the relation set to the "relation" on the object set to the "object" in the rule DB 16, it can be determined that the person performs abnormal behavior. Note that, a time period such as an operating time and a condition such that a target object is operating can be further added to the rule DB 16, and more detailed rule setting can be performed.

Note that the above information stored in the storage unit 12 is merely an example, and the storage unit 12 may store various types of information other than the above information.

The control unit 20 is a processing unit that is in charge of overall control of the information processing device 10, and is a processor or the like, for example. The control unit 20 includes an acquisition unit 21, a specification unit 22, a determination unit 23, and a notification unit 24. Note that each of the processing units is an example of an electronic circuit included in a processor, or an example of a process to be performed by the processor.

For example, the acquisition unit 21 acquires the video obtained by imaging inside of various facilities such as a factory by the camera device 100, from the imaging DB 13.

Note that the video captured by the camera device 100 is transmitted to the information processing device 10 by the camera device 100 as needed, received by the information processing device 10, and stored in the imaging DB 13.

For example, the specification unit 22 specifies a first region including an object included in the video, a second region including a person included in the video, and a relation identifying interaction between the object and the person, by analyzing the video acquired by the acquisition unit 21. Note that the first region and the second region may be, for example, Bboxes. Furthermore, the relation to be specified may include, for example, the type of the relation such that a person approaches, touches, or steps on an object. Furthermore, such specification processing may include, for example, processing for generating a scene graph in which the first region, the second region, and the relation are specified, for each person included in the video, by inputting the video acquired by the acquisition unit 21 into the machine learning model. The generation of the scene graph will be more specifically described with reference to FIG. 7.

Figure 7:
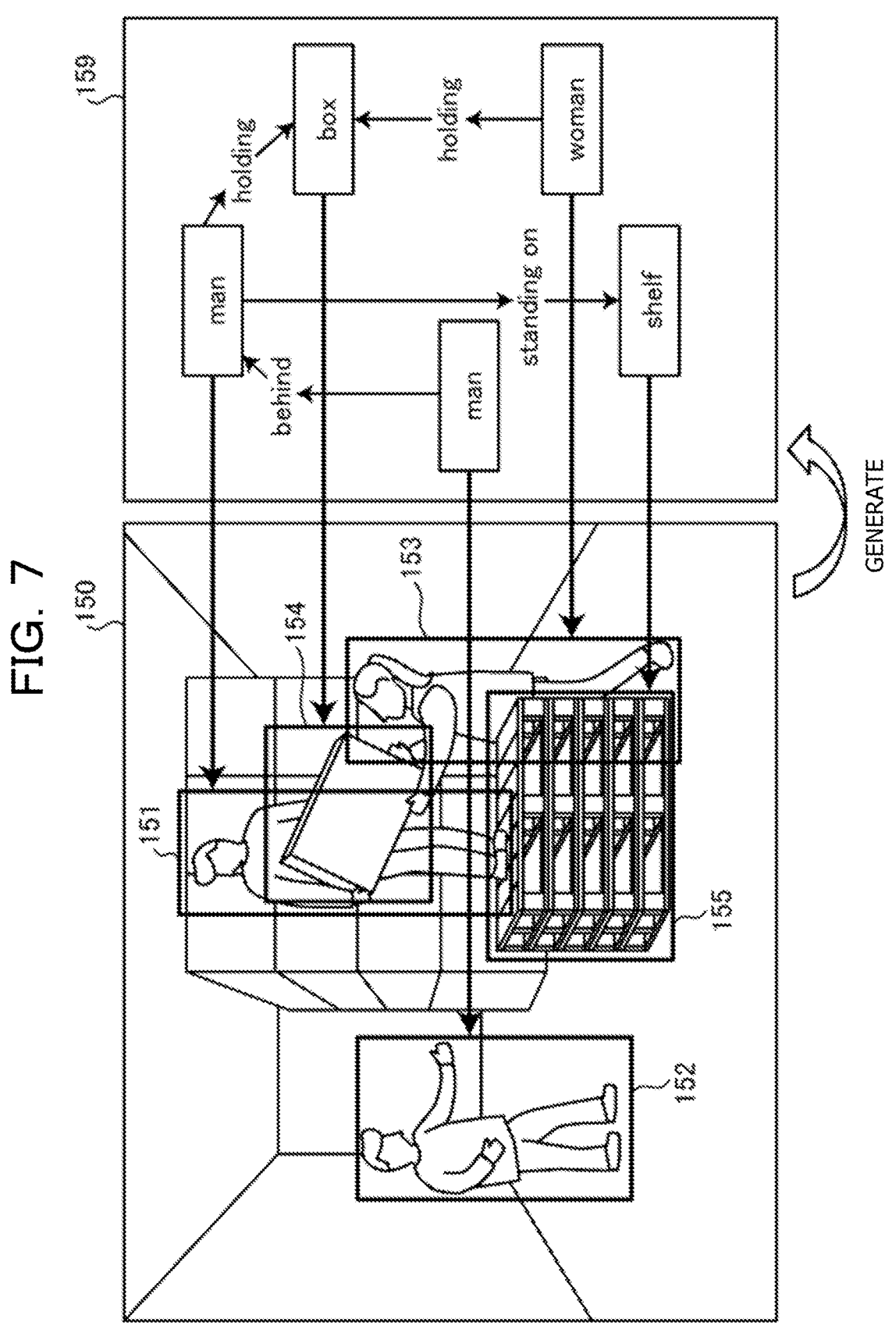
FIG. 7 is a diagram illustrating an example of relation specification based on a scene graph according to the present embodiment.

FIG. 7 is a diagram illustrating an example of relation specification based on the scene graph according to the present embodiment. For example, the specification unit 22 detects an object including a person using an existing detection algorithm from a captured image 150, estimates a relation of each object, and generates a scene graph 159 that expresses each object and the relation of these, that is, context. Here, the existing detection algorithm is, for example, YOU only look once (YOLO), single shot multi-box detector (SSD), region based convolutional neural networks (RCNN), or the like.

In the example in FIG. 7, from the captured image 150, at least two men (man) indicated by Bboxes 151 and 152, a woman (woman) indicated by a Bbox 153, a box (box) indicated by a Bbox 154, and a shelf (shelf) indicated by a Bbox 155 are detected. Then, for example, the specification unit 22 detects a Bbox region of each object from the captured image 150, extracts a feature amount of each region, estimates a relation of each object from a feature amount of a pair of objects (subject and object), and generates the scene graph 159. In FIG. 7, the scene graph 159 indicates, for example, a relation in which the man indicated by the box 151 is standing on (standing on) the shelf (shelf) indicated by the Bbox 155. Furthermore, for example, the relation regarding the man indicated by the box 151 indicated in the scene graph 159 is not limited to one. As illustrated in FIG. 7, in the scene graph 159, all estimated relations such as behind (behind) the man indicated by the box 152 or holding (holding) the box (box) indicated by the Bbox 154, in addition to the shelf (shelf). In this way, the specification unit 22 can specify the relation between the object and the person included in the video, by generating the scene graph.

However, since the scene graph has a disadvantage, by solving the problem, the specification unit 22 can more accurately specify the relation between the object and the person included in the video.

Figure 8:
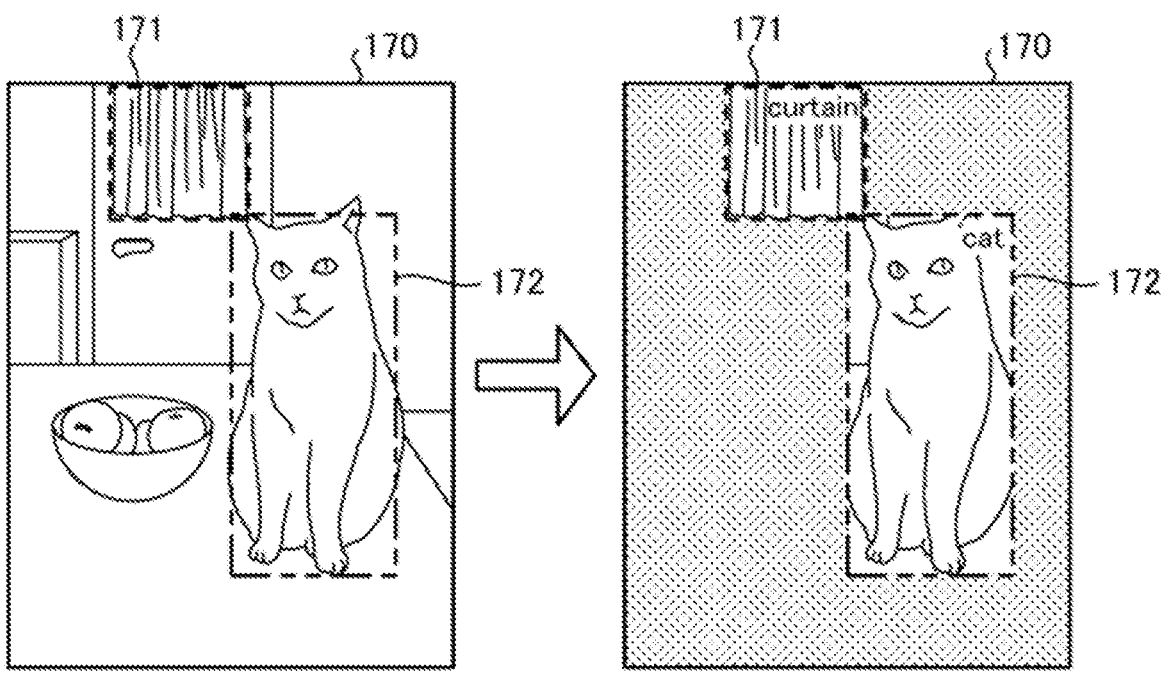
FIG. 8 is a diagram for explaining a disadvantage in scene graph generation.

FIG. 8 is a diagram for explaining a disadvantage in scene graph generation. When the scene graph is generated, for example, as illustrated in FIG. 8, since each object is extracted from a captured image 170, there is a case where important information in terms of context, outside regions of a Subject Bbox 171 and an Object Bbox 172, is overlooked. More specifically, as illustrated in the right side of FIG. 8, although respective regions of a Bbox 171 of a curtain (curtain) and a Bbox 172 of a cat (cat) are detected, information regarding regions other than those is not used when a relation between the cat and the curtain is estimated. Therefore, even if there is important information when the relation between the cat and the curtain is estimated, the information is overlooked. For example, by looking at objects around the cat and the curtain and a room structure, it is possible to estimate that the curtain is behind the cat. However, in general scene graph generation, when the relation between the cat and the curtain is estimated, information regarding the surroundings is not used. Therefore, when the relation between the objects is estimated, by using the information regarding the surroundings, it is possible to more accurately specify the relation. For example, in the example in FIG. 8, from the captured image 170, it is possible to estimate a relation such that an apple is next to a cat, there is a high possibility that a table is placed below the cat and the apple, and a curtain is behind the cat because the curtain is hung on a door.

Therefore, in the present embodiment, a contextually important region is adaptively extracted from an entire image for each subject and object that is a target of relation estimation, and the relation between the targets is recognized. The extraction of the important region in order to recognize the relation is realized by generating a map (hereinafter, referred to as "attention map") that takes a value of zero to one according to an importance, for example.

Figure 9:
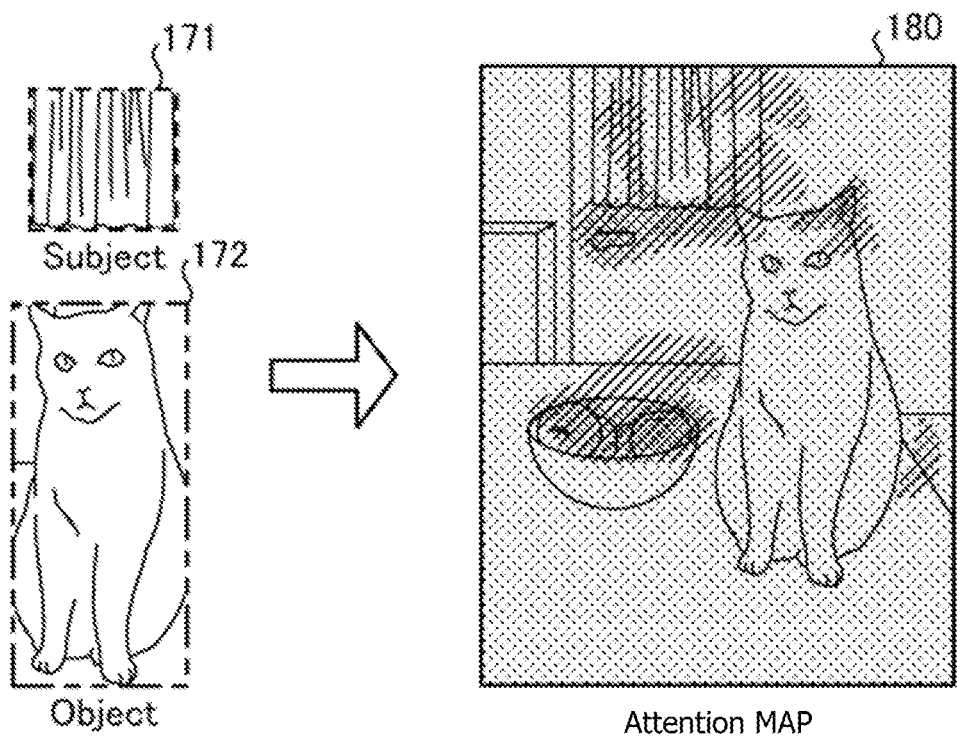
FIG. 9 is a diagram illustrating an example of attention map generation according to the present embodiment.

FIG. 9 is a diagram illustrating an example of attention map generation according to the present embodiment. As illustrated in FIG. 9, for example, when estimating a relation between the curtain that is the subject and the cat that is the object, the specification unit 22 generates an attention map 180 expressing an important region other than the regions of the Bboxes 171 and 172 and uses the attention map 180 to estimate the relation. The attention map 180 is generated, for example, using a machine learning model that trained and generated using a feature amount of an object detected from a captured image as input data, so that a rate of recognizing a relation between the objects increases. Furthermore, for example, as illustrated in FIG. 9, in the attention map 180, the importance of the important region to estimate the relation between the subject and the object is expressed by a color, a shade, or the like. Note that, since it is not recognized in advance where the contextually important region is in the captured image, the specification unit 22 generates the attention map 180, for example, for an entire image. As a result, the specification unit 22 can more accurately extract the contextually important region, and in addition, can more accurately specify the relation between the objects.

The estimation of the relation between the objects using the attention map 180 will be more specifically described with reference to FIGS. 10 to 15. The estimation of the relation between the objects using the attention map 180 may be performed, for example, using a neural network (NN).

Figure 10:
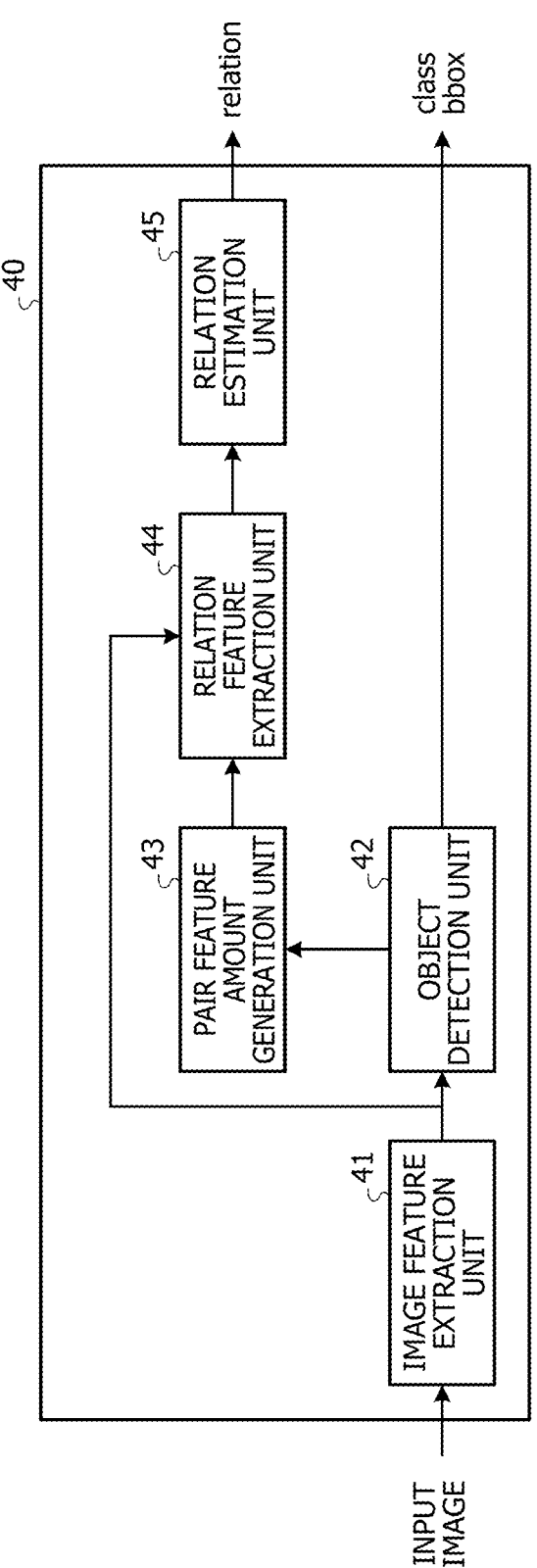
FIG. 10 is a diagram illustrating an example of an NN configuration to estimate a relation according to the present embodiment.

FIG. 10 is a diagram illustrating an example of an NN configuration to estimate a relation according to the present embodiment. As illustrated in FIG. 10, an NN 40 used to estimate the relation between the objects using the attention map 180 includes, for example, an image feature extraction unit 41, an object detection unit 42, a pair feature amount generation unit 43, a relation feature extraction unit 44, and a relation estimation unit 45. For example, when a video obtained by imaging a scene, that is, a captured image is input, the NN 40 executes processing from processing by the image feature extraction unit 41 and outputs a Bbox of an object detected by the object detection unit 42 and a type (class) of the object. Furthermore, the NN 40 outputs a relation between the objects detected by the object detection unit 42, estimated by the relation estimation unit 45. Such processing by each processing unit included in the NN 40 will be described for each processing.

Figure 11:
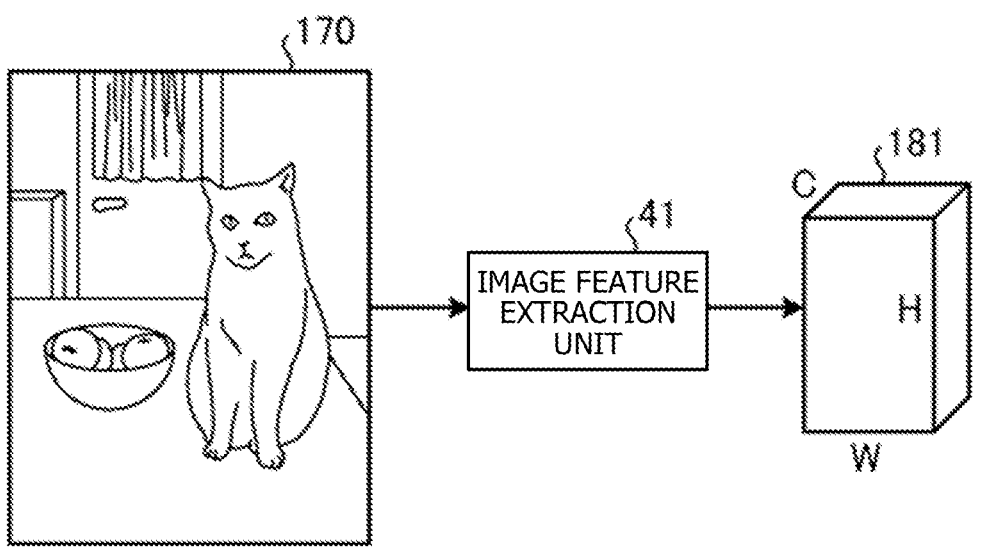
FIG. 11 is a diagram illustrating an example of image feature extraction according to the present embodiment.

First, feature extraction from the captured image performed by the image feature extraction unit 41 will be described. FIG. 11 is a diagram illustrating an example of image feature extraction according to the present embodiment. As illustrated in FIG. 11, for example, the image feature extraction unit 41 extracts an image feature amount 181 of a C channel from the captured image 170 of an RGB 3 channel. Note that the image feature extraction unit 41 may include, for example, a convolutional neural network (CNN), a Transformer, or the like, which is an existing technology. Furthermore, it is possible to use the CNN and the Transformer that has trained a Classification task or the like with a large-scale image dataset such as the ImageNet in advance. Furthermore, a width W and a height H of the image feature amount are generally smaller than a width and a height of the captured image 170 in an input image, that is, the example in FIG. 11, with the CNN or Pooling processing.

Figure 12:
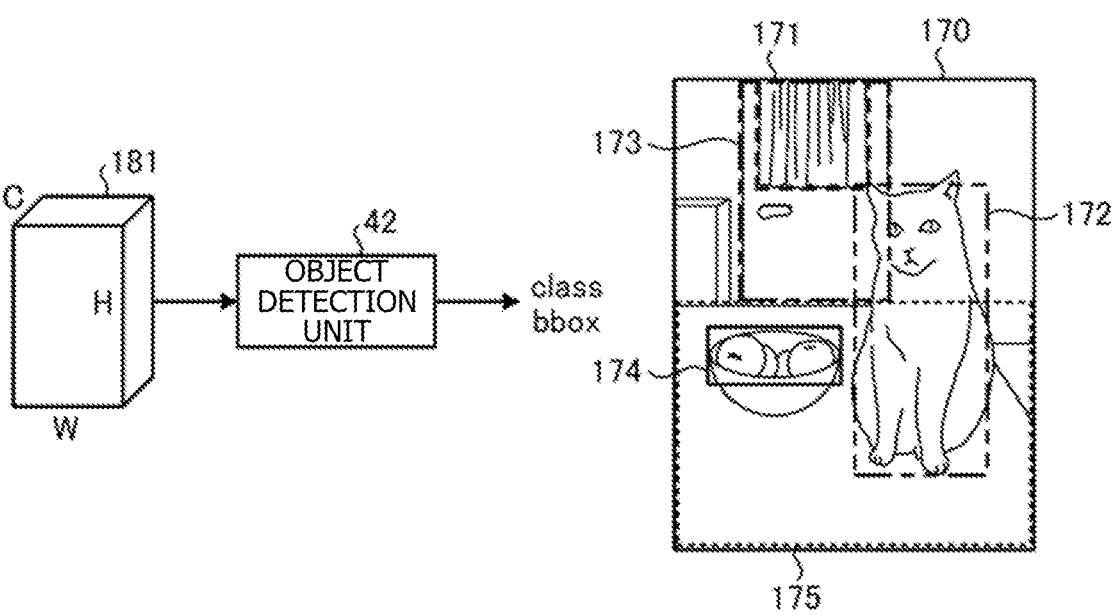
FIG. 12 is a diagram illustrating an example of object detection according to the present embodiment.

Next, object detection from the image feature amount performed by the object detection unit 42 will be described. FIG. 12 is a diagram illustrating an example of object detection according to the present embodiment. As illustrated in FIG. 12, for example, the object detection unit 42 receives the image feature amount 181 extracted by the image feature extraction unit 41 and outputs Bboxes 171 to 175 of the respective objects included in the captured image 170 and a class indicating the type of the object. Note that, in the example in FIG. 12, the Bboxes 171 to 175 are indicated as bboxes. Furthermore, as an output example, for example, as illustrated on the right side of FIG. 12, the object detection unit 42 can illustrate the Bboxes 171 to 174 of the respective detected objects to be overlapped on the captured image and output that. Furthermore, the class indicating the type of each object, such as a curtain (curtain) or a cat (cat) may be output to the vicinity of each Bbox.

Note that a rectangle of the Bbox can be expressed, for example, by four real values such as upper left coordinates (x1, y2) and lower right coordinates (x2, y2) of the rectangle. Furthermore, the class output from the object detection unit 42 is, for example, a probability value that the object detected by the Bbox is a predetermined object to be detected. More specifically, for example, in a case where the object to be detected is {cat, table, car} (cat, table, car), in the example in FIG. 12, the class of the Bbox 172 corresponding to the cat is a probability value indicating each object to be detected, such as (0.9, 0.1, 0.2). In other words, the class in this case indicates that the probabilities that the detected object is the cat (cat), the table (table), and the car (car) are respectively 0.9, 0.1, and 0.2. Note that the object detection unit 42 may include, for example, faster region based convolutional neural networks (R-CNN), Mask R-CNN, DEtection TRansformer (DETR), or the like that are NNs for object detection according to an existing technology.

Figure 13:
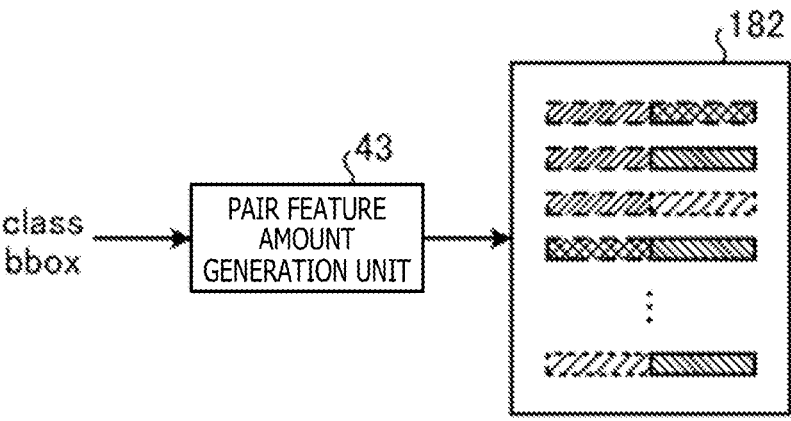
FIG. 13 is a diagram illustrating an example of pair feature amount generation according to the present embodiment.

Next, a feature amount of each pair of the detected objects performed by the pair feature amount generation unit 43 will be described. FIG. 13 is a diagram illustrating an example of pair feature amount generation according to the present embodiment. As illustrated in FIG. 13, the pair feature amount generation unit 43 extracts the feature amount of each detected object, for each object, based on the object detected by the object detection unit 42, that is, the output class and Bbox, for example. At this time, as the pair feature amount generation unit 43, RoIAlign of the Mask R-CNN or the like can be used. Furthermore, in a case where the object detection unit 42 includes a DETR, the feature amount for each object output by a Transformer decoder can be used. Furthermore, the extracted feature amount may be, for example, a real vector of 256 dimensions or the like, for each object.

Then, the pair feature amount generation unit 43 pairs one object as the subject and another object as the Object, for all combinations of all the detected objects. A pair feature amount 182 indicated on the right side of FIG. 13 is arrangement of feature amounts of the subject and the object for each pair. Furthermore, in order to adjust the number of dimensions of the pair feature amount 182, the pair feature amount generation unit 43 may convert the feature amounts of the subject and the object by the multi layer perceptron (MLP), which is an existing technology.

Figure 14:
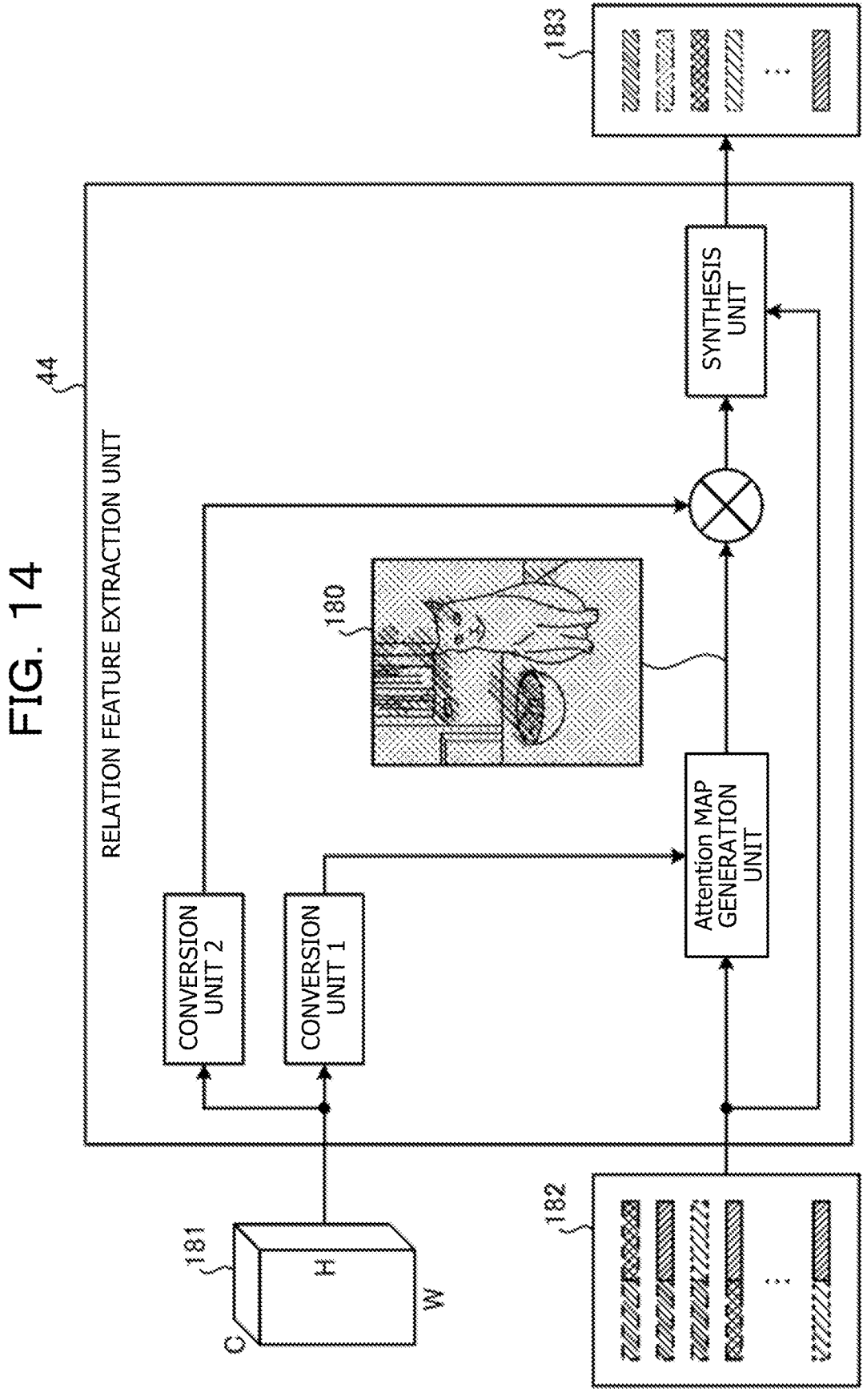
FIG. 14 is a diagram illustrating an example of relation feature extraction according to the present embodiment.

Next, extraction of the feature amount indicating the relation between the detected and paired objects, performed by the relation feature extraction unit 44 will be described. FIG. 14 is a diagram illustrating an example of relation feature extraction according to the present embodiment. As illustrated in FIG. 14, the relation feature extraction unit 44 includes, for example, a conversion unit 1, a conversion unit 2, an attention map generation unit, and a synthesis unit.

First, as illustrated in FIG. 14, the relation feature extraction unit 44 converts the image feature amount 181 extracted by the image feature extraction unit 41, by each of the conversion units 1 and 2, so as to use the image feature amount 181 in subsequent processing. The conversion units 1 and 2 may be implemented, for example, by a multilayer-perceptron (MLP) or the like. Furthermore, in the example in FIG. 14, since the conversion units 1 and 2 are implemented by the MLPs having different weights, the conversion units 1 and 2 are distinguished from each other.

Next, the relation feature extraction unit 44 generates the attention map 180 by correlating the image feature amount converted by the conversion unit 1, with each line of the pair feature amount 182 generated by the pair feature amount generation unit 43, by the attention map generation unit. Note that, each line of the pair feature amount 182 means each pair of the subject and the object. Furthermore, the relation feature extraction unit 44 may convert the attention map 180 by the MLP or Layer normalization, after correlating the pair feature amount 182 with the image feature amount converted by the conversion unit 1.

Here, processing for correlating one pair feature amount 182 with the image feature amount converted by the conversion unit 1 will be more specifically described. Note that it is assumed that the pair feature amount 182 be adjusted to a C-dimensional vector through processing in a previous stage. Furthermore, it is assumed that the image feature amount converted by the conversion unit 1 be a H×W tensor of which a channel direction is a C dimension. Furthermore, attention is paid to a pixel (x, y) having the image feature amount converted by the conversion unit 1, and this pixel is referred to as an attention pixel. Since the attention pixel is 1×1×C, the attention pixel can be assumed as a C-dimensional vector. Then, the attention map generation unit correlates the C-dimensional vector of the attention pixel and the pair feature amount 182 adjusted to be the C-dimensional vector and calculates a correlation value (scalar). As a result, a correlation value of the attention pixel (x. y) is determined. The attention map generation unit executes this processing on all the pixels and generates the attention map 180 of H×W×1.

Then, the relation feature extraction unit 44 extracts a feature amount of an important region in an entire image corresponding to the pair of the subject and the object, by obtaining a weighted sum by multiplying the generated attention map 180 by the image feature amount converted by the conversion unit 2. Note that, since the weighted sum is obtained for the entire image, the feature amount taking the weighted sum is a C-dimensional feature amount, for a single pair of the subject and the object.

Furthermore, the weighted sum of the attention map 180 and the image feature amount converted by the conversion unit 2 will be more specifically described. Note that it is assumed that the image feature amount converted by the conversion unit 2 be a tensor of H×W×C. First, the relation feature extraction unit 44 multiplies the attention map 180 by the image feature amount converted by the conversion unit 2. At this time, since the attention map 180 is H×W×1, a channel is copied to the C-dimension. Furthermore, the relation feature extraction unit 44 adds all the C-dimensional vectors of the respective pixels for multiplied values. As a result, the single C-dimensional vector is generated. In other words, the single C-dimensional vector is generated for each attention map 180. Moreover, actually, since the attention maps 180 as many as the pair feature amounts 182 are generated, the C-dimensional vectors to be created as many as the pair feature amounts 182 are generated. Through the above processing, the relation feature extraction unit 44 obtains the weighted sum using the attention map 180 as a weight, with respect to the image feature amount converted by the conversion unit 2.

Then, the relation feature extraction unit 44 synthesizes, by the synthesis unit, the feature amount of the important region extracted by the attention map 180 and the pair feature amount 182 generated by the pair feature amount generation unit 43 and outputs the synthesized result as a relation feature amount 183. More specifically, the relation feature extraction unit 44 can use the feature amount of the important region coupled with the pair feature amount 182 in the dimension direction. Furthermore, the relation feature extraction unit 44 may convert the coupled feature amount in order to adjust the number of dimensions by the MLP or the like, after coupling the feature amount of the important region and the pair feature amount 182.

Figure 15:
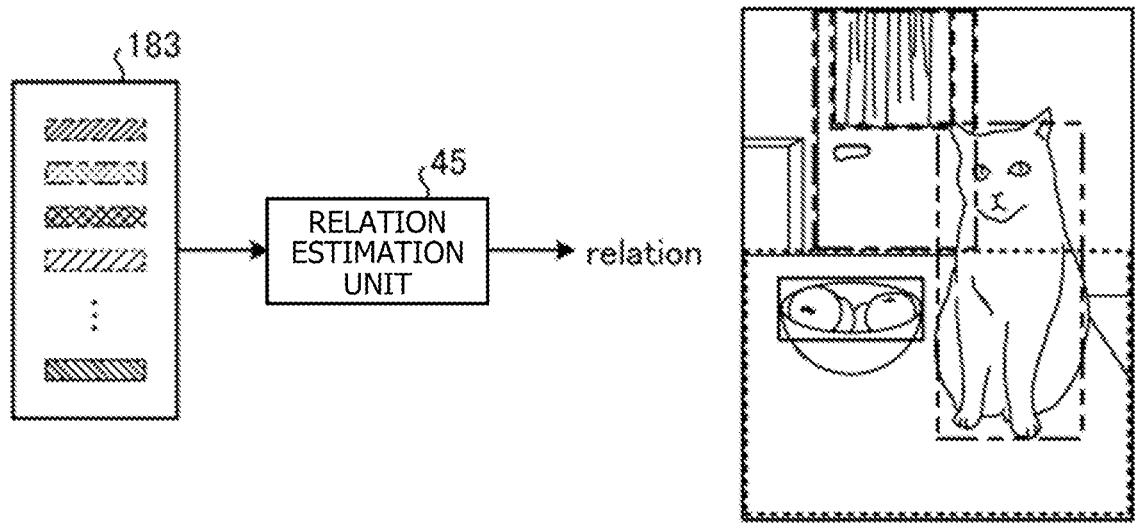
FIG. 15 is a diagram illustrating an example of relation estimation according to the present embodiment.

Next, estimation of the relation of each pair of the subject and the object performed by the relation estimation unit 45 will be described. FIG. 15 is a diagram illustrating an example of relation estimation according to the present embodiment. The relation estimation unit 45 receives the relation feature amount 183 output from the relation feature extraction unit 44 and outputs a relation (relation) corresponding to each pair of the subject and the object. Note that the relation estimation unit 45 may include, for example, a MLP, Batch normalization, or the like, which is an existing technology. Furthermore, the relation to be output is a probability value indicating that the relation is a predetermined relation to be estimated. Specifically, for example, in a case where the relation to be estimated is {on, behind, and hold} (on, behind, and hold), in the example in FIG. 15, as the relation between the curtain (curtain) and the cat (cat), a probability value with respect to each relation such as (0.1, 0.9, 0.2) is output. Then, in this case, the specification unit 22 can specify "behind" (behind) with the highest probability value as the relation between the curtain (curtain) and the cat (cat).

Each processing for estimating the relation between the objects using the attention map 180 described above is summarized as processing for specifying the relation of the objects executed by the specification unit 22 using the NN 40.

First, for example, the specification unit 22 extracts a first feature amount corresponding to a first region, which includes an object in a video, or a second region, which includes a person in the video, from the video. For example, the video may be a video obtained by imaging inside of various facilities such as a factory by the camera device 100, and the first region and the second region may be Bboxes. Furthermore, such extraction processing corresponds to the processing for extracting the image feature amount 181 from the captured image 170, by the image feature extraction unit 41, as described with reference to FIG. 11. In other words, in the example in FIG. 11, the captured image 170 corresponds to the video, and the image feature amount 181 corresponds to the first feature amount.

Next, for example, the specification unit 22 detects an object and a person included in the video, from the extracted first feature amount. Such processing for detecting the object and the person corresponds to processing for detecting Bboxes and classes of the object and the person from the image feature amount 181 corresponding to the first feature amount, by the object detection unit 42, as described with reference to FIG. 12.

Next, for example, the specification unit 22 generates a second feature amount in which first feature amounts of an object or a person in at least one pair of a plurality of detected objects, a plurality of detected persons, and the object and the person are combined. Such generation processing corresponds to processing for generating the pair feature amount 182 in which each feature amount of the detected object and person corresponding to the first feature amount is arranged for each pair, by the pair feature amount generation unit 43, as described with reference to FIG. 13. In other words, in the example in FIG. 13, the pair feature amount 182 corresponds to the second feature amount.

Next, the specification unit 22 generates a first map indicating a relation identifying at least one interaction of the plurality of objects, the plurality of persons, and the object and the person, based on the first feature amount and the second feature amount, for example. Such generation processing corresponds to processing for generating the attention map 180 based on the image feature amount 181 corresponding to the first feature amount and the pair feature amount 182 corresponding to the second feature amount, by the relation feature extraction unit 44, as described with reference to FIG. 14. In other words, in the example in FIG. 14, the attention map 180 corresponds to the first map.

Next, the specification unit 22 extracts a fourth feature amount based on a third feature amount obtained by converting the first feature amount and the first map, for example. Such extraction processing corresponds to processing for extracting the relation feature amount 183, based on the feature amount converted by the conversion unit 2 and the attention map 180 corresponding to the first map, by the relation feature extraction unit 44, as described with reference to FIG. 14. In other words, in the example in FIG. 14, the feature amount converted by the conversion unit 2 is a feature amount obtained by converting the image feature amount 181 corresponding to the first feature amount by the conversion unit 2 and corresponds to the third feature amount, and the relation feature amount 183 corresponds to the fourth feature amount.

Then, for example, the specification unit 22 specifies a relation identifying an interaction of an object and a person, from the fourth feature amount. Such specification processing corresponds to processing for estimating and specifying a relation (relation) between the object and the person, from the relation feature amount 183 corresponding to the fourth feature amount, by the relation estimation unit 45, as described with reference to FIG. 15.

In the above, the processing for specifying the relation identifying the interaction of the object and the person, using the scene graph and the attention map has been described. Furthermore, the specification unit 22 can specify the first region, the second region, the relation identifying the inter- action of the object and the person, by inputting, for example, the acquired video, in addition to the scene graph and the attention map, into a machine learning model for the HOID. The first region and the second region are respec- tively regions where the object and the person included in the video appear. Furthermore, the machine learning model for the HOID is a model trained to identify information regarding a first class indicating an object and the first region, information regarding a second class indicating a person and the second region, and an interaction between the first class and the second class. The HOID will be more specifically described with reference to FIG. 16.

FIG. 16 is a diagram illustrating an example of relation specification by the HOID according to the present embodi- ment. As illustrated in FIG. 16, the specification unit 22 inputs, for example, image data 190 that is a video obtained by imaging inside of various facilities such as a factory by the camera device 100, that is, a captured image into the machine learning model for the HOID and acquires an output result. As illustrated in FIG. 16, the output result is, for example, a Bbox 191 of a person, a class name of the person, a Bbox 192 of an object, a class name of the object, a probability value of an interaction between the person and the object, a class name of the interaction between the person and the object, or the like. Then, the specification unit 22 specifies, for example, the Bbox 192 of the object and the Bbox 191 of the person, respectively as the first region and the second region where the object and the person included in the video appear. Furthermore, for example, the specifi- cation unit 22 specifies a relation indicated by the class name of the interaction with the highest probability value of the interaction between the person and the object, as a relation identifying the interaction between the object and the per- son, from the output result of the machine learning model for the HOID.

Returning to FIG. 4, for example, the determination unit 23 determines whether or not the person included in the second region performs abnormal behavior, based on the first region including the object included in the video and the relation identifying the interaction between the object and the person, specified by the specification unit 22. Such determination processing may include processing for deter- mining whether or not the person included in the second region performs abnormal behavior, by comparing a com- bination of the type of the identified object and the specified relation with a preset rule, by analyzing the video. Here, the type of the identified object is, for example, a type of the object included in the first region. Furthermore, the preset rule is a rule of a relation between an object and a person so as to determine that the person performs abnormal behavior, to be stored in the rule DB 16, for example.

Furthermore, for example, the determination unit 23 specifies a first person indicating a different relation with respect to a predetermined object, from among a plurality of persons included in the video, based on the object included in the first region specified by the specification unit 22 and the specified type of the relation. Then, for example, the determination unit 23 determines that the first person per- forms abnormal behavior. This is based on an idea that, for example, in a case where only one person performs different behavior when a plurality of persons performs behavior with respect to a predetermined object, the person performs abnormal behavior. Therefore, in a case where only the first person causes a first relation identifying the interaction between the object and the person with respect to the predetermined object and a second person indicates a second relation, the determination unit 23 determines that the first person performs abnormal behavior. Here, for example, the second person is a person other than the first person, and the second relation is a relation different from the first relation.

Furthermore, the determination unit 23 specifies the first person indicating a predetermined relation with respect to the predetermined object, from among the plurality of per- sons included in the video, by analyzing the scene graph generated by the specification unit 22 and determines that the first person performs abnormal behavior.

For example, in a case where the determination unit 23 determines that the person performs abnormal behavior, the notification unit 24 notifies an alert related to appearance of the person who performs abnormal behavior. The alert may include, for example, an image or a video of the person who performs abnormal behavior and information regarding a position such as a place where the person exists. Then, a worker, an administrator, or the like in various facilities such as a factory receives the notification of the alert and stops the abnormal behavior, for example, by warning the person who is performing the abnormal behavior, so as to prevent occurrence of an accident in advance.

(Flow of Processing)

Figure 17:
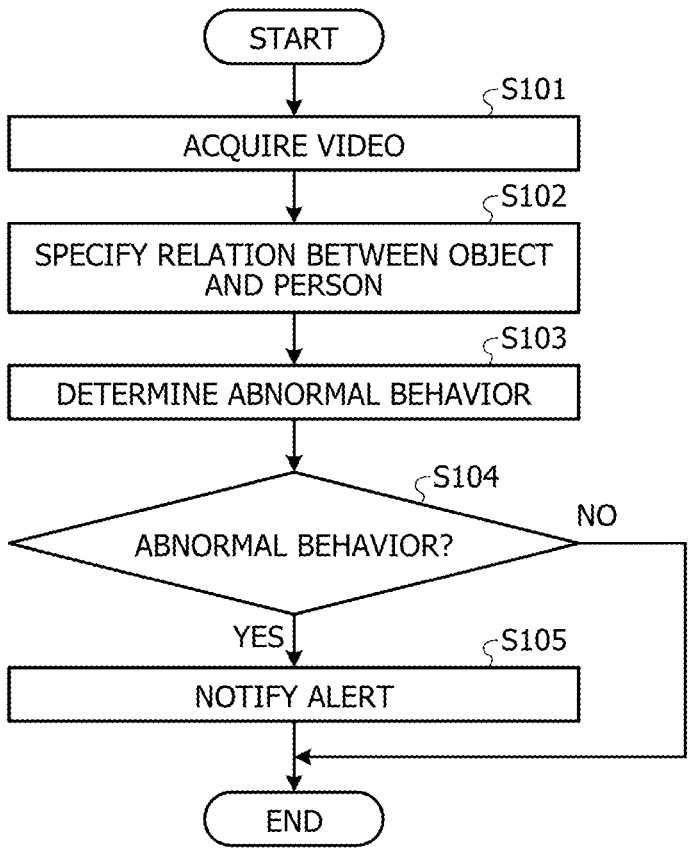
FIG. 17 is a flowchart illustrating a flow of abnormal behavior notification processing according to the present embodiment.

Next, a flow of abnormal behavior notification processing executed by the information processing device 10 will be described. FIG. 17 is a flowchart illustrating the flow of the abnormal behavior notification processing according to the present embodiment.

First, as illustrated in FIG. 17, for example, the informa- tion processing device 10 acquires a video obtained by imaging a predetermined imaging range in various facilities such as a factory by the camera device 100 from the imaging DB 13 (step S101). Note that the video captured by the camera device 100 is transmitted from the camera device 100 to the information processing device 10 as needed and is stored in the imaging DB 13.

Next, for example, the information processing device 10 specifies a region including an object, a region including a person, and a relation between the object and the person, from the video, by inputting the video acquired in step S101 into the machine learning model (step S102). Note that the region including the object and the person may be, for example, a Bbox surrounding the object or the person in the video in a rectangle. Furthermore, the relation between the object and the person may be, for example, the person approaches, touches, or steps on the object.

Next, for example, the information processing device 10 determines whether or not the person performs abnormal behavior, based on the relation between the object and the person specified in step S102 (step S103). In a case where it is determined that the person does not perform abnormal behavior (step S104: No), the abnormal behavior notifica- tion processing illustrated in FIG. 17 ends.

On the other hand, in a case where it is determined that the person performs abnormal behavior (step S104: Yes), the information processing device 10 notifies, for example, an alert related to appearance of the person who is performing the abnormal behavior (step S105). After the execution of step S105, the abnormal behavior notification processing illustrated in FIG. 17 ends.

Figure 18:
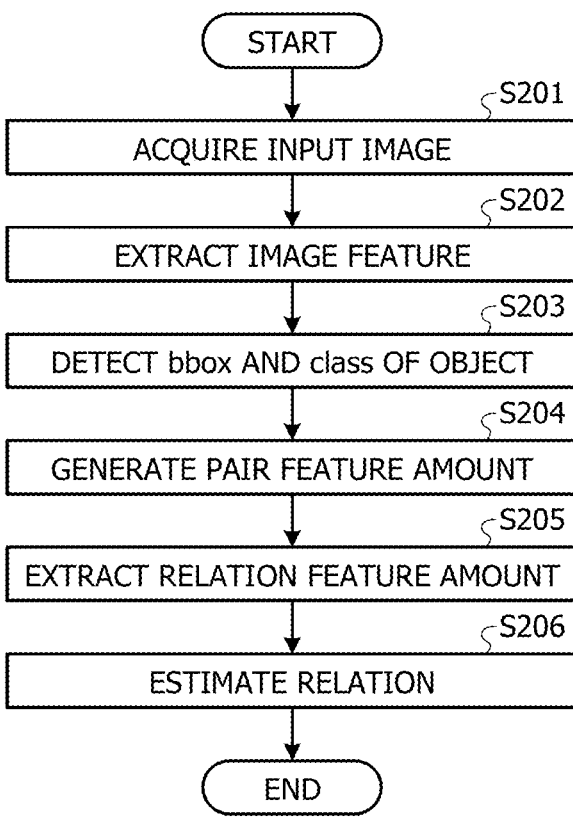
FIG. 18 is a flowchart illustrating a flow of relation estimation processing according to the present embodiment.

Next, a flow of relation estimation processing executed by the information processing device 10 will be described. FIG. 18 is a flowchart illustrating the flow of the relation estimation processing according to the present embodiment. The relation estimation processing illustrated in FIG. 18 is the processing for estimating the relation between the object and the person using the NN 40 described with reference to FIGS. 10 to 15.

First, for example, the information processing device 10 acquires a video obtained by imaging a predetermined imaging range in various facilities such as a factory by the camera device 100, that is, an input image, from the imaging DB 13 (step S201). Note that, the input image includes an image of one frame in the video. In a case where the video is stored in the imaging DB 13, one frame is acquired as the input image from the video.

Next, for example, the information processing device 10 extracts the image feature amount 181 as an image feature of the input image, from the input image acquired in step S201 (step S202).

Next, for example, the information processing device 10 detects a Bbox indicating a place of each object and a class indicating a type of each object included in the video, from the image feature amount 181 extracted in step S202, using an existing technology (step S203). Note that a person may be included in each object detected here, and a person may be included in each object in the following description.

Next, for example, the information processing device 10 generates a second feature amount obtained by combining a first feature amount of each object in each pair of the objects detected in step S203, as the pair feature amount 182 (step S204).

Next, for example, the information processing device 10 synthesizes the feature amount of the important region for relation estimation, extracted by the attention map 180 and the pair feature amount 182 and extracts the relation feature amount 183 (step S205). Note that the attention map 180 is generated from the pair feature amount 182 extracted in step S204.

Then, the information processing device 10 estimates a relation of each object detected from the image, for example, based on the relation feature amount 183 extracted in step S205 (step S206). Note that the estimation of the relation may be, for example, calculating a probability value for each type of the relation. After the execution of step S206, the relation estimation processing illustrated in FIG. 18 ends.

(Effects)

As described above, the information processing device 10 acquires the video, specifies the first region including the object included in the video, the second region including the person included in the video, and the relation identifying the interaction between the object and the person by analyzing the acquired video, determines whether or not the person included in the second region performs abnormal behavior, based on the specified first region and the specified relation, and notifies the alert related to the appearance of the person who is performing the abnormal behavior in a case of determining that the person performs the abnormal behavior.

In this way, the information processing device 10 specifies the relation between the object and the person from the video, determines whether or not the person performs abnormal behavior based on the specified relation, and notifies the alert. As a result, the information processing device 10 can more accurately determine and notify that the person performs abnormal behavior from the video.

Furthermore, the processing for determining whether or not the person performs abnormal behavior executed by the information processing device 10 includes processing for identifying the type of the object included in the first region by analyzing the video and determining whether or not the person included in the second region performs the abnormal behavior, by comparing the combination of the identified type of the object and the specified relation with a preset rule.

As a result, the information processing device 10 can more accurately determine that the person performs abnormal behavior from the video.

Furthermore, the processing for specifying the first region, the second region, and the relation executed by the information processing device 10 includes the processing for specifying the first region, the second region, and the type of the relation by analyzing the acquired video, and the processing for determining whether or not the person performs abnormal behavior includes processing for specifying the first person indicating the different relation with respect to the predetermined object, from among the plurality of persons included in the video, based on the object included in the specified first region and the specified type of the relation and determining that the first person performs abnormal behavior.

As a result, the information processing device 10 can more accurately determine that the person performs abnormal behavior from the video.

Furthermore, the processing for determining that the first person performs the abnormal behavior, executed by the information processing device 10 includes processing for determining that the first person performs the abnormal behavior, in a case where only the first person causes the first relation identifying the interaction between the object and the person with respect to the predetermined object and the person other than the first person indicates the second relation different from the first relation with respect to the predetermined object.

As a result, the information processing device 10 can more accurately determine that the person performs abnormal behavior from the video.

Furthermore, the processing for specifying the first region, the second region, and the relation executed by the information processing device 10 includes processing for generating the scene graph that specifies the first region, the second region, and the relation for each person included in the video, by inputting the acquired video into the machine learning model, and the processing for determining whether or not the person performs abnormal behavior includes processing for specifying the first person indicating the predetermined relation with respect to the predetermined object, from among the plurality of persons included in the video, by analyzing the scene graph and determining that the first person performs the abnormal behavior.

As a result, the information processing device 10 can more accurately determine that the person performs abnormal behavior from the video.

Furthermore, the processing for specifying the first region, the second region, and the relation, executed by the information processing device 10 includes processing for extracting the first feature amount that corresponds to the first region or the second region from the video, detecting the object and the person included in the video from the extracted first feature amount, generating the second feature amount obtained by combining the first feature amount included in the object or the person in at least one pair of a plurality of the detected objects, a plurality of the persons, or the object and the person, or any combination of the plurality of detected objects, the plurality of persons, and the object and the person, generating the first map that indicates the relation that identifies at least one of the interactions of the plurality of objects, or the plurality of persons, or the object and the person, or any combination of the plurality of objects, the plurality of persons, or the object and the person, based on the first feature amount and the second feature amount, extracting the fourth feature amount, based on the third feature amount obtained by converting the first feature amount and the first map, and specifying the relation from the fourth feature amount.

As a result, the information processing device 10 can more accurately determine that the person performs abnormal behavior from the video.

Furthermore, the processing for specifying the first region, the second region, and the relation executed by the information processing device 10 includes processing for specifying the first region, the second region, and the relation by inputting the acquired video into the machine learning model, and the machine learning model is the model for the HOID trained to identify the information regarding the first class indicating the object and the first region indicating the region where the object appears, the information regarding the second class indicating the person and the second region indicating the region where the person appears, and the interaction between the first class and the second class.

As a result, the information processing device 10 can more accurately determine that the person performs abnormal behavior from the video.

(System)

Pieces of information including the processing procedures, the control procedures, the specific names, the various types of data, and the parameters described above or illustrated in the drawings may be changed as appropriate, unless otherwise specified. Furthermore, the specific examples, distributions, numerical values, and the like described in the embodiment are merely examples, and may be changed as appropriate.

Furthermore, specific forms of distribution and integration of components of individual devices are not limited to those illustrated in the drawings. That is, all or a part of the components may be functionally or physically distributed or integrated in optional units, according to various types of loads, use situations, or the like. Moreover, all or an optional part of individual processing functions of each device may be implemented by a central processing unit (CPU) and a program analyzed and executed by the CPU, or may be implemented as hardware by wired logic.

(Hardware)

Figure 19:
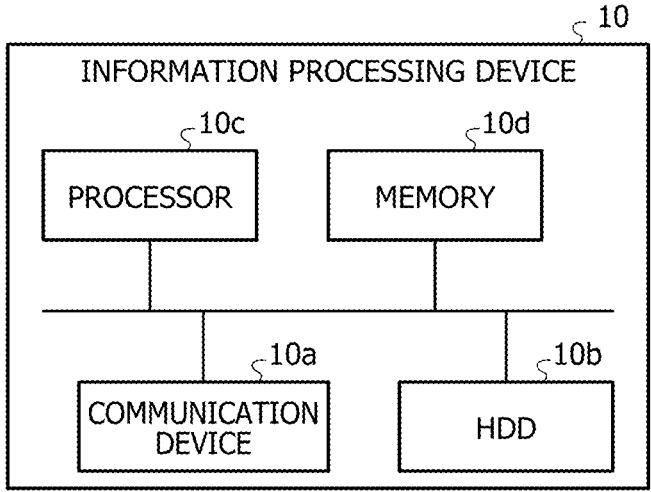
FIG. 19 is a diagram for explaining a hardware configuration example of the information processing device 10.

FIG. 19 is a diagram for explaining a hardware configuration example of the information processing device 10. As illustrated in FIG. 19, the information processing device 10 includes a communication device 10a, a hard disk drive (HDD) 10b, a processor 10c, and a memory 10d. Furthermore, the individual units illustrated in FIG. 19 are mutually coupled by a bus or the like.

The communication device 10a is a network interface card or the like and communicates with another information processing device. The HDD 10b stores a program that activates the functions illustrated in FIG. 4, and a database (DB).

The processor 10c is a hardware circuit that reads a program that executes processing similar to the processing of each processing unit illustrated in FIG. 4, from the HDD 10b or the like, and loads the read program into the memory 10d to activate a process that executes each function described with reference to FIG. 4 or the like. In other words, this process implements a function similar to that of each processing unit included in the information processing device 10. Specifically, the processor 10c reads a program having functions similar to those of the acquisition unit 21, the specification unit 22, the determination unit 23, the notification unit 24, or the like from the HDD 10b or the like. Then, the processor 10c executes a process for executing processing similar to the specification unit 22 or the like.

In this manner, the information processing device 10 operates as an information processing device that executes operation control processing by reading and executing the program for executing processing similar to that of each processing unit illustrated in FIG. 4. Furthermore, the information processing device 10 may also implement functions similar to those of the embodiment described above by reading a program from a recording medium using a medium reading device and executing the read program. Note that the program in another embodiment is not limited to a program to be executed by the information processing device 10. For example, in a case where the another information processing device executes a program and in a case where the information processing device 10 and the another information processing device execute the program in cooperation, the present embodiment may be similarly applied.

Furthermore, the program that executes processing similar to that of each processing unit illustrated in FIG. 4 may be distributed via a network such as the Internet. Furthermore, this program may be recorded in a computer-readable recording medium such as a hard disk, a flexible disk (FD), a CD-ROM, a magneto-optical disk (MO), or a digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a video analyzing program for causing a computer to execute processing comprising:

acquiring a video;

extracting a first feature amount from the video;

detecting an object and a person included in the video from the extracted first feature amount, the first feature amount including an object feature amount and a person feature amount;

specifying a first region that includes the object included in the video and a second region that includes the person included in the video;

generating a second feature amount obtained by combining the object feature amount and the person feature amount for the object and the person in a pair of the object and the person;

generating a first map that indicates a relation that identifies an interaction between the object and the person based on the first feature amount and the second feature amount;

extracting a fourth feature amount, based on a third feature amount obtained by converting the first feature amount and the first map;

specifying the relation that identifies the interaction between the object and the person from the fourth feature amount;

determining whether or not the person included in the second region performs abnormal behavior, based on the specified first region and the specified relation; and notifying an alert related to appearance of the person who performs the abnormal behavior in a case of determining that the person performs the abnormal behavior.

2. The non-transitory computer-readable recording medium according to claim 1, wherein the determining whether or not the person performs abnormal behavior includes identifying a type of the object included in the first region, by analyzing the video, and determining whether or not the person included in the second region performs the abnormal behavior, by comparing a combination of the identified type of the object and the specified relation with a preset rule.

3. The non-transitory computer-readable recording medium according to claim 1, wherein the determining whether or not the person performs abnormal behavior includes in case where the detecting detects a plurality of persons in the video, specifying, from among the plurality of persons included in the video, a first person whose relation between a predetermined object is different from that of another person based on the object included in the specified first region and the specified type of the relation, and determining that the first person performs abnormal behavior.

4. The non-transitory computer-readable recording medium according to claim 3, wherein the determining that the first person performs abnormal behavior includes determining that the first person performs the abnormal behavior, in a case where only the first person causes a first relation that identifies an interaction between the object and the person, with respect to the predetermined object and the person other than the first person indicates a second relation different from the first relation with respect to the predetermined object.

5. A video analyzing method comprising:

acquiring a video;

extracting a first feature amount from the video;

detecting an object and a person included in the video from the extracted first feature amount, the first feature amount including an object feature amount and a person feature amount;

specifying a first region that includes the object included in the video and a second region that includes the person included in the video;

generating a second feature amount obtained by combining the object feature amount and the person feature amount for the object and the person in a pair of the object and the person;

generating a first map that indicates a relation that identifies an interaction between the object and the person based on the first feature amount and the second feature amount;

extracting a fourth feature amount, based on a third feature amount obtained by converting the first feature amount and the first map;

specifying the relation that identifies the interaction between the object and the person from the fourth feature amount;

determining whether or not the person included in the second region performs abnormal behavior, based on the specified first region and the specified relation; and notifying an alert related to appearance of the person who performs the abnormal behavior in a case of determining that the person performs the abnormal behavior.

6. The information processing method according to claim 5, wherein the determining whether or not the person performs abnormal behavior includes identifying a type of the object included in the first region, by analyzing the video, and determining whether or not the person included in the second region performs the abnormal behavior, by comparing a combination of the identified type of the object and the specified relation with a preset rule.

7. The information processing method according to claim 5, wherein the determining whether or not the person performs abnormal behavior includes in case where the detecting detects a plurality of persons in the video, specifying, from among the plurality of the persons included in the video, a first person that indicates the different relation that is different from that of another person based on the object included in the specified first region and the specified type of the relation, and determining that the first person performs abnormal behavior.

8. The information processing method according to claim 7, wherein the determining that the first person performs abnormal behavior includes determining that the first person performs the abnormal behavior, in a case where only the first person causes a first relation that identifies an interaction between the object and the person, with respect to the predetermined object and the person other than the first person indicates a second relation different from the first relation with respect to the predetermined object.

9. A video analyzing device comprising:

a memory; and a processor coupled to the memory and configured to perform a processing of:

acquiring a video;

extracting a first feature amount from the video;

detecting an object and a person included in the video from the extracted first feature amount, the first feature amount including an object feature amount and a person feature amount;

specifying a first region that includes the object included in the video and a second region that includes the person included in the video;

generating a second feature amount obtained by combining the object features amount and the person feature amount for the object and the person in a pair of the object and the person;

generating a first map that indicates a relation that identifies an interaction between the object and the person based on the first feature amount and the second feature amount;

extracting a fourth feature amount, based on a third feature amount obtained by converting the first feature amount and the first map;

specifying the relation that identifies the interaction between the object and the person from the fourth feature amount;

determining whether or not the person included in the second region performs abnormal behavior, based on the specified first region and the specified relation; and notifying an alert related to appearance of the person who performs the abnormal behavior in a case of determining that the person performs the abnormal behavior.

10. The information processing device according to claim 9, wherein the determining whether or not the person performs abnormal behavior includes identifying a type of the object included in the first region, by analyzing the video, and determining whether or not the person included in the second region performs the abnormal behavior, by comparing a combination of the identified type of the object and the specified relation with a preset rule.

11. The information processing device according to claim 9, wherein the determining whether or not the person performs abnormal behavior includes in case where the detecting detects a plurality of persons in the video, specifying, from among the plurality of the persons included in the video, a first person that indicates the relation that is different from that of another person based on the object included in the specified first region and the specified type of the relation, and determining that the first person performs abnormal behavior.

12. The information processing device according to claim 11, wherein the determining that the first person performs abnormal behavior includes determining that the first person performs the abnormal behavior, in a case where only the first person causes a first relation that identifies an interaction between the object and the person, with respect to the predetermined object and the person other than the first person indicates a second relation different from the first relation with respect to the predetermined object.

* * * * *